June 8, 1943.  W. S. REYNOLDS  2,321,320
GAUGING MACHINE
Filed May 23, 1940  3 Sheets-Sheet 3

INVENTOR
Warren S. Reynolds
BY
ATTORNEYS

Patented June 8, 1943

2,321,320

UNITED STATES PATENT OFFICE 2,321,320

GAUGING MACHINE

Warren S. Reynolds, Stratford, Conn., assignor to Remington Arms Company, Inc., a corporation of Delaware Application May 23, 1940, Serial No. 336,712

14 Claims. (Cl. 209—104)

This invention relates to gauging apparatus. Although the invention is very advantageous for gauging cartridge cases its use is not confined thereto. It is particularly useful in gauging flanged and headed articles such as headed rivets, screws, bolts, pintles and many other articles.

Because many articles, of necessarily close dimensions, are now made in very large quantities, there is much need for gauging apparatus which will automatically and accurately gauge large quantities of such articles in a comparatively short time. The provision of a suitable mechanism for this purpose makes possible a 100% inspection of such products, rather than the inspection of only a small percentage thereof, as was often the case in the past.

It is therefore an important object of the present invention to provide an apparatus adapted to accurately and automatically gauge a large quantity of product in a comparatively short time.

A feature resulting from the attainment of this object includes the provision of at least one pair of power-driven gauging members suitably supported in a spaced and slightly angular relationship to each other, so that the outer peripheral and gauging sections thereof converge at the gauging location, and so that the same sections elsewhere spread and make possible easy disposition of both undersize and right-size product.

It is a further and very important object of the present invention to provide gauging apparatus capable of automatically gauging and separating good and bad product.

A feature related to this objective is the provision of a simple apparatus which causes undersize products to pass or to be initially forced through gauging members and to simply drop by gravity into a suitable container below the apparatus, and which carries right-size products to another location for diversion into a suitable container.

Other novel functional and structural features resulting from the attainment of the above and related objects, and provided by the present invention, include: an extensive area to or upon the gauging members to insure a long gauging life; sturdily supported and accurately controlled or located gauging members which insure an accurate gauging result; main gauging members with simpler outer gauging elements, whereby the main wear and gauging elements alone may be easily replaced; a plurality of main gauging units on the one apparatus or machine, whereby a double operation or result is achieved; a fully automatic gauging of product, at a high speed; pressing mechanism to insure accurate gauging; rotatable gauging members at an angle to each other, whereby undersize product may drop through the machine between the gauging members; concurrently rotated gauging members and rotatable pressing means; roller-backed rotatable gauging members; adjustment mechanism, whereby divers sizes of product may be gauged in the one machine; simple yet efficient means for feeding product to and from gauging members.

Other objects, features and advantages will appear hereinafter.

In the drawings, which illustrate one of the present preferred embodiments of the invention:

Before describing the present improvements and mode of operation thereof in detail it should be understood that the invention is not limited to the details of construction and arrangement of parts shown in the accompanying drawings, which are merely illustrative of the present preferred embodiments, since the invention is capable of other embodiments, and the phraseology employed is for the purpose of description and not of limitation.

Figure 1:
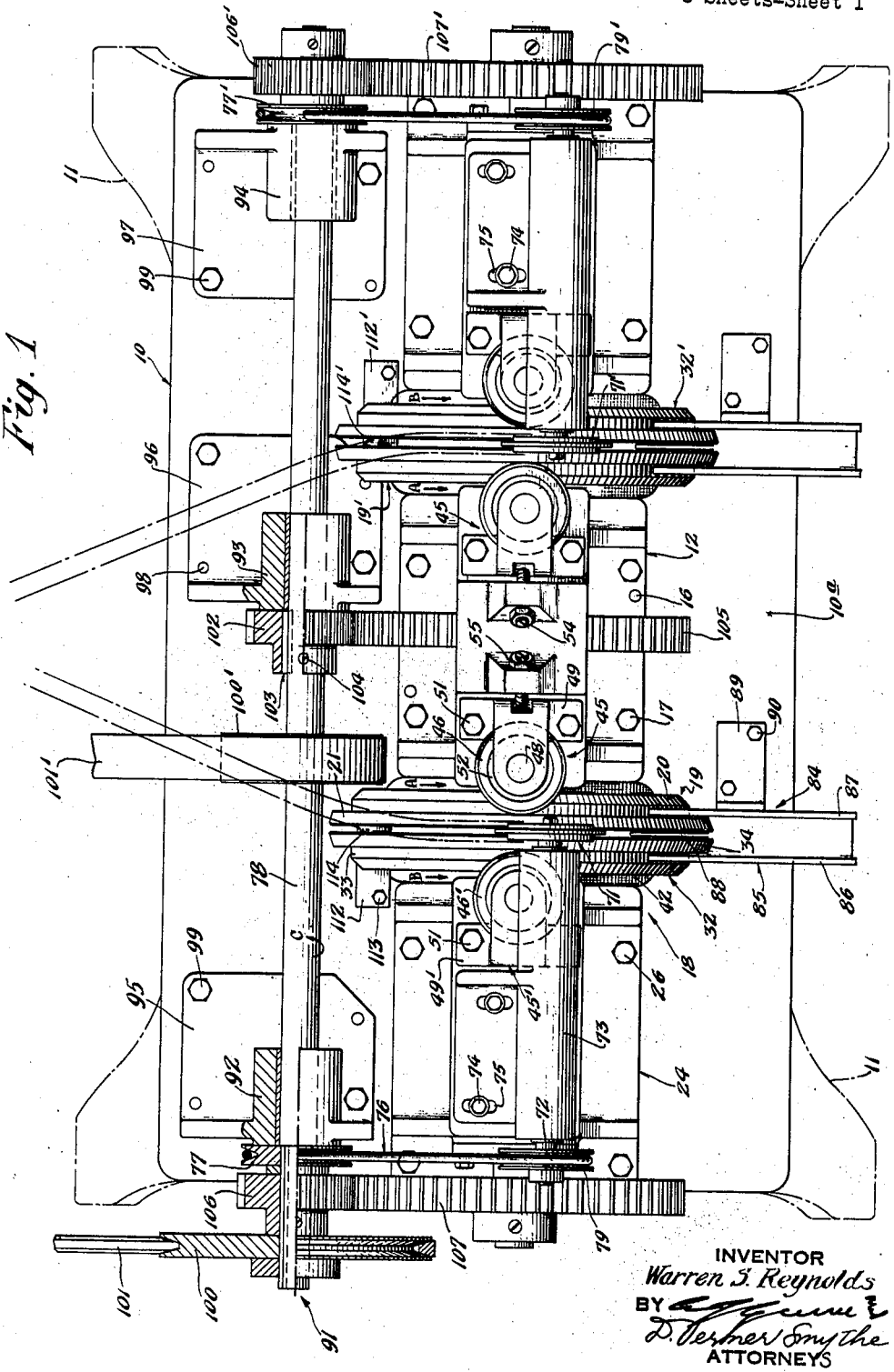
Figure 1 is a top plan view of the gauging apparatus.
Figure 2:
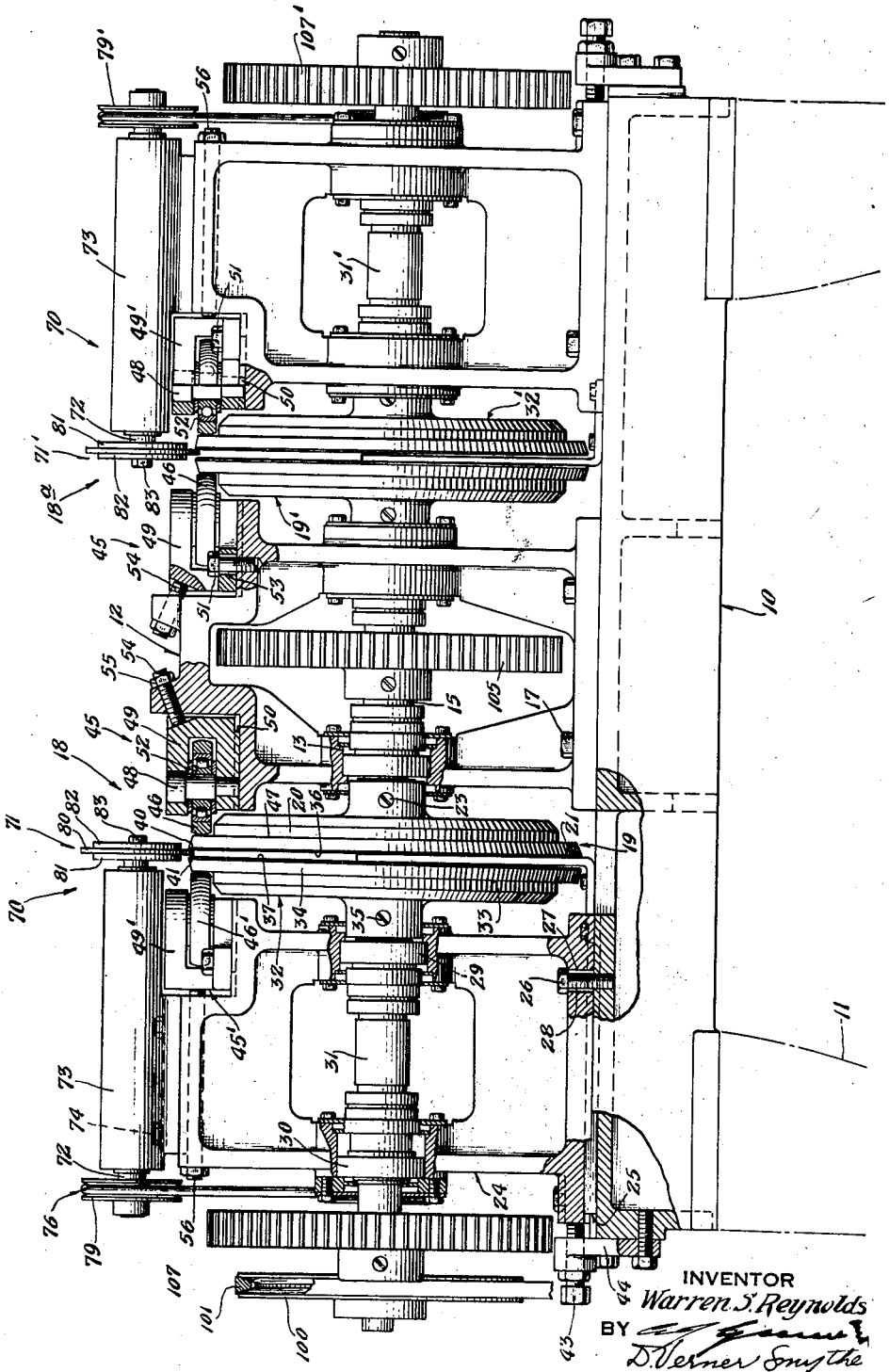
Fig. 2 is a front view.

Referring now in detail to the drawings, which illustrate a present preferred embodiment of the invention, for use in gauging flanged cartridge blanks, there is shown a main frame 10 which may be secured directly to a bench, or which may be supported on the floor as by legs 11 shown in part with dot-and-dash lines in Figs. 1 and 2. Near the middle of the frame 10 there is provided a main or center standard 12 having a pair of bores 13 with suitable bearings 14 adapted to sturdily support a main shaft 15 for rotation. This center standard may be made integral with the main frame 10; or, as shown, may be a separate member secured to the frame as by pins 16 and bolts 17. The bearings 14 sturdily support the main shaft against both transverse and longitudinal movement. Because any of a number of conventional bearing structures might be used, as bearings 14, detailed showing and description thereof is not included herein.

Considering the left-hand half of the main frame 10, as viewed in Fig. 1, there is shown a gauging unit 18 including a main gauging member 19 upon the outer free end of the main shaft 15. This gauging member preferably comprises a circular plate 20, which may be made of cast iron or other inexpensive material, having a gauging disc or ring 21 of hard material preferably forced thereon and secured thereto as by screws 22. The gauging member may be secured to the main shaft as by a screw 23.

Adjacent the center standard 12 there is provided a movable standard 24 having a tongue and slot connection 25 with the main frame 10 for shifting longitudinally of the main frame toward and from the center standard 12 and main gauging member 19, where it is held by bolts 26 passing through holes 27 threaded into the main frame 10 as may be seen best in Fig. 2. The holes 27 are larger than shanks 28 on bolts 26 to provide a clearance and make possible a longitudinal shifting and adjustment of the movable standard 24 relative to the center standard 12 and main gauging member 19. This movable standard is provided with suitable bearings 29 and 30 to support a cooperating shaft 31 for free rotation, and to prevent radial and longitudinal shifting. These bearings may be of any well-known type, and in conformity with good and usual machine-shop practice. The inner end of the cooperating shaft is provided with a gauging member 32 which is substantially a duplicate of the gauging member 19, as it comprises a circular plate 33 with a ring 34 secured thereto. The gauging member 19 may be secured to the cooperating shaft as by a screw 35.

Figure 6:
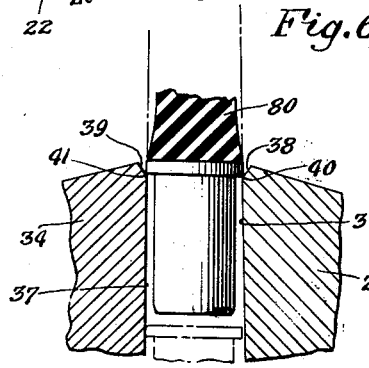
Fig. 6 is an enlarged fragmentary detail of the gauging members with one form of work, or article being gauged, therein.

The main shaft 15 and cooperating shaft 31 may be parallel or substantially parallel, as viewed from the top of the machine. Also, the peripheral faces 36 and 37 of the gauging members 19 and 32 may include concave sections 38 and 39 to receive flanges of articles and centralize the articles, as shown in Fig. 6. To adapt the apparatus for divers products it is merely necessary to replace the mating rings 21 and 34 with others having the preferred form of work-receiving configuration.

Of particular importance, and in accordance with the present invention, the main shaft 15 and cooperating shaft 31 are at a slight angle horizontally relative to each other. Preferably the main shaft is substantially horizontal with the floor or bench upon which the apparatus is mounted, and the cooperating shaft 31 is at a slight angle axially relative thereto with the outer end of the cooperating shaft extending upwardly relative to the inner end thereof, and relative to the horizontal plane of the main shaft 15. This serves to bring the upper peripheral edges 40 and 41 and adjacent faces 36 and 37 of the gauging members 19 and 32 (or the upper halves thereof) into closest proximity with each other, and serves to provide a gradually increasing space between the gauging members 19 and 32 vertically downwardly between the two and a relatively wider spacing of the lower halves.

Thus, any undersize products or articles which pass downwardly between the top and closest parts of the gauging members 19 and 32 may drop freely by gravity entirely downwardly through the gauging members and through suitable openings 42 in the table section of the main frame 10 into a suitable container under the machine.

Main adjustment of the movable standard 24 and cooperating gauging member 32 is effected by loosening the bolts 26 and shifting them (standard 24 and member 32) toward or from the main gauging member 19. A screw 43, in a plate 44 preferably secured to the end of the main frame 10, may be used to move the standard and cooperating gauging member 32 toward the main gauging member 19 and to prevent retractive or spreading movement thereof. When the desired setting is effected the movable standard 24 may be locked in the desired position by merely tightening the bolts 26.

To prevent wobbling and to further insure and maintain an accurate spacing between the gauging members 19 and 32 the present invention provides a backing member 45 which, in the present preferred form, includes a backing roller 46 engageable with rear face 47 of the gauging member 19. Said roller is rotatably mounted on a stud 48 carried in a slide member 49 having a tongue and slot connection 50 with the main standard 12. The slide member is locked to the standard as by bolts 51. The roller may be a plain hardened ring rotatably mounted directly upon the stud 48 but is preferably provided with a roller-bearing interponent 52 to lessen friction, prevent wear on the stud 48 and insure a long life between the roller and the stud. Preferably elongated slots 53 are provided in the slide member 49 to clear the bolts 51 and make possible shifting of the slide member 49 longitudinally of the machine in the tongue and slot connection 50. To effect fine adjustment of the slide member 49 toward the gauging member 19, and to further maintain the roller 46 in the desired position relative thereto, the present invention provides a screw 54 which is substantially in a central vertical plane with respect to the tongue and slot connection 50, adapted to engage the back of the slide member 49 and to push it to the left, as viewed in Figs. 1 and 2. A lock nut 55 is provided to maintain the adjustment screw in the desired position. This roller has the real advantage of preventing any axial movement of the main shaft 15 and gauging member 19, especially if any wear should occur that might otherwise allow axial movement thereof. It also prevents the gauging member from wobbling.

Preferably a backing member 45′, slide member 49′ and roller 46′ are also provided on the movable standard 24. These are similar to backing member 45, roller 46 and slide member 49 just described in detail, differing therefrom mainly in the provision of a slightly different adjustment screw 56 which is longer and is horizontally rather than angularly disposed. In view of the similarity of the various parts thereof to the backing member 45 detailed description thereof appears unnecessary. However, it should be appreciated that either or both of backing members 45 and 45′ serve to accurately maintain the gauging members 19 and 32 in accurately spaced relation to each other and prevent retraction of these gauging members away from each other if at any time the main shaft 15 or cooperating shaft 31 becomes worn or otherwise adversely movable.

Work feeding means

Figure 4:
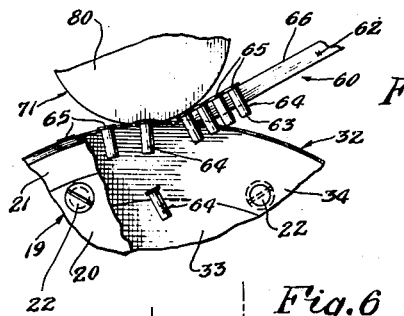
Fig. 4 is a fragmentary side view of the gauging unit.
Figure 5:
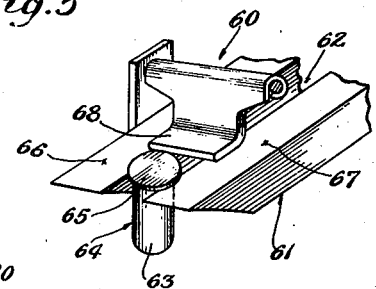
Fig. 5 is a detail view of one form of work feed device.

Although the gauging apparatus provided by the present invention may be loaded or fed directly by hand, a work feeding device 60 capable of directing a flow of work to the apparatus is provided. One such device is shown herein as an example, particularly in Figs. 4 and 5, and includes a bar 61 with a slot 62 adapted to accommodate the shank 63 of cartridge blanks 64 so that flanges 65 upon the latter ride upon the top faces 66 and 67. This bar may be of short or substantial length and may be manually loaded. Preferably, however, it is connected to and is automatically loaded by any conventional hopper mechanism. The cartridge blanks preferably slide by gravity down the slotted bar 61 until the shanks thereof slide between the gauging members 19 and 32 so that the underside of the flange 65 rests upon the peripheral edges 40 and 41. The underside of the bar 61 is preferably curved slightly and tapered so that as the cartridge blanks leave the bar the flanges 65 thereof are substantially even with the periphery of the gauging members 19 and 32. A plate 68 may be pivotally mounted upon the lower end of the bar 61 to insure a proper feed of the cartridge blanks to the gauging members 19 and 32. As will be readily appreciated, the same general form of bar may be used for other articles, or the slot therein may be slightly changed in shape for articles of special form.

Work pressing means

The present invention provides a novel pressing mechanism 70 to force undersize articles which are being gauged downwardly between the gauging members 19 and 32, whereby the same drop by gravity downwardly between the gradually wider spaced sections of the gauging members 19 and 32 and thence through a suitable opening 42 in a table section 10a of the main frame 10 preferably into a suitable container below the machine. In its preferred form this pressing mechanism comprises a resilient roller 71 carried upon a spindle 72 in a suitable spindle head 73 which is preferably secured to the top of the cooperating standard 24, as by bolts 74. Preferably these bolts pass through slots 75 which are elongated transversely of the machine to permit setting the resilient roller in various positions along the gap between the gauging members 19 and 32. The resilient roller may be rotated coordinately with the gauging members 19 and 32 as by a belt connection 76 extending between a driver pulley 77 on a main drive shaft 78 and a driven pulley 79 at the outer end of the spindle 72. Preferably the resilient roller 71 includes a large soft rubber disc 80 securely held between metal plates 81 and 82 upon the spindle 72 when a nut 83 is tightened.

Ejecting means

The present invention also preferably provides an ejector device 84 for diverting the good work to a container. This ejector device comprises a chute 85 with side walls 86 and 87 and a finger 88 extending a considerable extent between the gauging members 19 and 32. The finger serves to divert all of the right-size articles which are being carried by the gauging members, in a counterclockwise direction, as viewed in Figs. 3 and 4, outwardly of the gauging members and downwardly on the chute 85 into any suitable container. The ejecting means is preferably supported upon the main frame as by a bracket 89 and screws 90. Although this ejecting means is very simple it does serve very effectively to divert and direct the good pieces of work from the machine.

Figure 3:
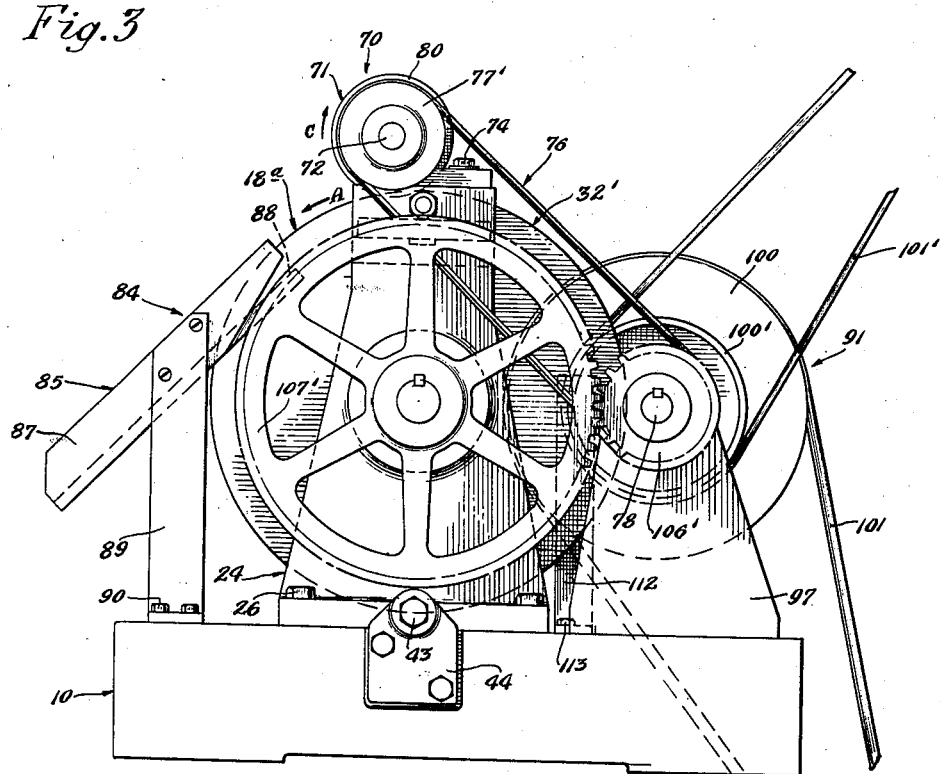
Fig. 3 is an end view.

The forward or inner end of the finger 88 is preferably to the left (vertically) relative to the pressing mechanism 70, as viewed in Fig. 3, to clear any articles which are undersize and drop through, or are forced through by the pressing mechanism 70. Preferably the inner end extends inwardly of the gauging members to a point underlying the end of the undersize gap between the gauging members so that if any proper-size articles fall through the gauging members as the latter gradually spread apart, and as the articles are carried in a counterclockwise direction, as viewed in Fig. 3, they merely drop upon the finger 88 and slide down the same out from between the gauging members into a suitable container.

Duplex mechanism

The gauging apparatus of the present invention may include but a single gauging unit 18, as shown in the left-hand half of Figs. 1 and 2 particularly and described in detail. However, for economy, decrease in floor space, increased operator's performance and a doubled output from the one machine it is preferably to provide a duplex mechanism including a second gauging unit 18a which, as will be readily apparent, is substantially a duplicate of unit 18 described in detail, so that further detailed description thereof is unnecessary.

However, it should be noted that, according to the present invention, this duplex structure has been conceived and developed in such a way that it is possible to use: (1) the one main shaft 15 for the main gauging members 19 and 19' of both units 18 and 18a; (2) the one driving connection between the main drive shaft 78 and main shaft 15 to operate both main gauging members; (3) two gauging units close together, or localized, so that an operator can easily and carefully observe both units simultaneously. Other related and worthwhile advantages have also been achieved thereby.

Driving mechanism

Preferably the gauging members 19 and 32 and the pressing mechanism 70 of both units 18 and 18a are coordinately rotated in the direction of the arrows A, B and C. Further, the peripheral speed of the gauging members and the pressing member are preferably substantially the same. For this purpose the present invention provides a driving mechanism 91 which, in the present preferred form, includes a main drive shaft 78 extending longitudinally of the frame 10, suitably supported in standards 92, 93 and 94, which may be made integral with the main frame 10; or in the form of separate brackets 95, 96 and 97 secured to the top of the main frame as by pins 98 and studs 99.

This main drive shaft 78 may be driven in any suitable manner. For the purpose of illustration, a main pulley 100 is shown secured at one end of the main drive shaft, with a belt or like connection 101 to a line shaft or to any other suitable prime mover (not shown). A pulley 100' and belt 101' drive any suitable hopper (not shown). A driver gear 102 is secured to the main drive shaft by a suitable spline connection 103 and lock screw 104 adjacent the center standard 93 and serves to rotate a large driven gear 105 secured to the main shaft 78, as may be seen best in Figs. 1, 2 and 3. Somewhat similarly driver gears 106 and 106' are secured to the outer ends of the main drive shaft and are adapted to rotate driven gears 107 and 107' at the outer ends of cooperating shafts 31 and 31' respectively. Pulleys 77 and 77' at the outer ends of the main drive shaft 78 may be provided with any suitable type of belt connection to pulleys 79 at the outer ends of the spindles 72 for the pressing rollers 71. Suitable and conventional screw and spline connections may be provided to secure the pulleys 77 and 77' and gears 106 and 106' to the outer ends of the main drive shaft 78 and to concurrently prevent axial movement of the main drive shaft 78.

With this main driving mechanism it is possible to concurrently operate the unit 18, gauging members 19 and 32 and the pressing mechanism 70, all with substantially the same peripheral speed, for as the main drive shaft 78 is rotated the driver gears 102 and 106 rotate the cooperating driven gears 105 and 107 and the associated gauging members 19 and 32 respectively while the pulley 77 on the main drive shaft 78 through a suitable belt connection (or the like) connected to the pulley 79 rotates the pressing roller 71.

Concurrently and similarly unit 18a may be operated, for the driver gears 102 and 106' cooperating with the driven gears 105 and 107' rotate the main shaft 15 and cooperating shaft 31' to effect coordinate rotation of the gauging members 19' and 32' while the pulley 77' at the right-hand side of the machine, as viewed in Fig. 1, through a belt connection to the pulley 79' serves to rotate the spindle and pressing roller 71'.

Preferably the angular location of the cooperating shaft 31 is such that the gauging members 19 and 32 are closest together near the top center of the machine and the feeding mechanism 60 places the work on the gauging member near this close section. Also, the pressing mechanism 70 is preferably located over the work at this close section so that all of the main gauging function is accomplished near the top center of the machine between the ends of the work feeding mechanism and the pressing mechanism. Thus, if any of the articles are undersize they will fall downwardly between the gauging members, or will be forced downwardly therebetween by the pressing member 71. As the right-size articles are carried beyond the pressing member the gauging members gradually open. However, beyond the pressing roller the work ejector serves to catch the proper-size work and divert it from the gauging members to a suitable point or container extraneously of the machine.

Figure 7:
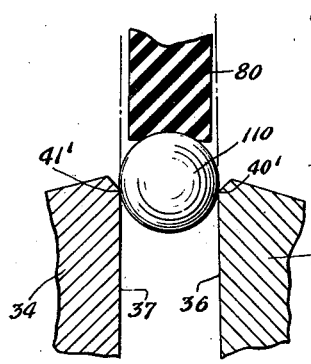
Fig. 7 is a fragmentary detail similar to Fig. 6 with another form of work.

Although this invention is particularly useful in gauging flanged and shouldered articles it may be used to gauge divers other articles. For example, and as shown in Fig. 7, it may be used to gauge balls 110 which ride upon the peripheral edges 40' and 41' of gauging members 19 and 32, respectively, if they are of the right diameter, and drop, or are initially forced by the pressing mechanism 70, downwardly between faces 36 and 37 thereof if undersize. One or both units 18 and 18a may be used.

Suitable L-shaped guide pieces 112 and 112' may be secured on the frame 10 as by bolts 113 with upstanding sections 114 and 114' respectively extending between the gauging members to loosen or strip any of the articles which might happen to wedge between the gauging members, and to confine travel of the falling undersize articles to the opening 42.

Other variations and modifications may be made within the scope of this invention and portions of the improvements may be used without others.

Having thus described the invention what is claimed as new is:

1. In a gauging apparatus, the combination of a frame; a main shaft; main gauging members on said main shaft; a pair of cooperating shafts; cooperating gauging members on said cooperating shafts adjacent said main gauging members; means for supporting said cooperating shafts and said cooperating gauging members at an angle axially relative to said main shaft; and means for coordinately rotating said main and said cooperating gauging members whereby said gauging members are disposed more closely to each other during a portion of their rotary path so as to form a gauging slot therebetween, and spread apart during another portion of their path so as to discharge articles failing to pass through the gauging slot.

2. In a gauging apparatus, the combination of a frame; a main shaft; a pair of main gauging members on said main shaft; a pair of cooperating shafts; a pair of cooperating gauging members on said cooperating shafts; means for supporting said cooperating shafts and said cooperating gauging members at an angle axially relative to said main shaft; work pressing means cooperating with said gauging members; and means for coordinately rotating at least one pair of said gauging members whereby said gauging members are disposed more closely to each other during a portion of their rotary path so as to form a gauging slot therebetween, and spread apart during another portion of their path so as to discharge articles failing to pass through the gauging slot.

3. In a gauging apparatus, the combination of a frame; a main shaft; a pair of main gauging members on said main shaft; a pair of cooperating shafts; a pair of coperating gauging members on said cooperating shafts; means for supporting said cooperating shafts and said cooperating gauging members at a slight angle axially relative to said main shaft; work pressing means cooperating with said gauging members; and means for coordinately rotating said main and said cooperating gauging members and for operating said pressing means whereby said gauging members are disposed more closely to each other during a portion of their rotary path so as to form a gauging slot therebetween, and spread apart during another portion of their path so as to discharge articles failing to pass through the gauging slot.

4. In a gauging apparatus, the combination of a frame; a pair of gauging members; rotating shafts for supporting said gauging members spaced apart and at a vertical angle axially relative to each other; work feeding means; work ejecting means; work pressing means cooperating with said work feeding means; and driving means adapted to rotate said gauging members relative to said ejecting means and thereby to remove work from said gauging members.

5. In a gauging apparatus, the combination of a frame; gauging members; rotating shafts for supporting said gauging members spaced apart and at a vertical angle axially relative to each other; ejector means, including a finger extending between said gauging members and immovable relative thereto; and driving means adapted to rotate said gauging members relative to said ejector means and thereby to remove work from said gauging members.

6. In a gauging apparatus, the combination of a frame; at least one pair of planar gauging members; means for supporting said gauging members at a vertical angle axially relative to each other; roller means mounted to rotate in a plane substantially at right angles to the plane of rotation of said gauging members and backing the outer section of at least one of said gauging members; means for setting said roller means relative to the gauging members; and means for rotating at least one of said gauging members toward the other gauging member so as to form a gauging slot.

7. In a gauging apparatus, the combination of a frame; rotatable members having interchangeable gauging rings; angularly disposed shafts for supporting said rotatable members and rings at a vertical angle relative to each other with said rings closely spaced at the upper half to form a gauging slot therebetween and widely spaced at the lower half; and driving means for concurrently operating said rotatable members and rings.

8. In an apparatus for gauging articles having body and flange portions, the combination of a frame; at least one pair of gauging members; means for supporting said gauging members; and means for rotating at least one of said gauging members, said supporting means being constructed and arranged to support said gauging members at an angle axially relative to each other in a position whereby the gauging members are disposed more closely to each other during a portion of the rotary path of one of the gauging members so as to form a gauging slot between the gauging members to accommodate the bodies and flanges of the articles respectively between and upon the pair of gauging members when the flanges are of proper size, said gauging members being spaced apart during another portion of the rotary path of the rotating gauging member so as to discharge articles failing to pass through the gauging slot.

9. In an apparatus for gauging articles having body and flange portions, the combination of a frame; at least one pair of gauging members; means for supporting said gauging members; means for rotating at least one of said gauging members, said supporting means being constructed and arranged to support said gauging members at an angle axially relative to each other in a position whereby the gauging members are disposed more closely to each other during a portion of the rotary path of one of the gauging members so as to form a gauging slot between the gauging members to accommodate the bodies and flanges of the articles respectively between and upon the pair of gauging members when the flanges are of proper size, said gauging members being spaced apart during another portion of the rotary path of the rotating gauging member so as to discharge articles failing to pass through the gauging slot; and yielding means for pressing the articles toward said gauging members.

10. In an apparatus for gauging articles having body and flange portions, the combination of a frame; at least one pair of gauging members; means for supporting said gauging members; means for rotating at least one of said gauging members, said supporting means being constructed and arranged to support said gauging members at an angle axially relative to each other in a position whereby the gauging members are disposed more closely to each other during a portion of the rotary path of one of the gauging members so as to form a gauging slot between the gauging members to accommodate the bodies and flanges of the articles respectively between and upon the pair of gauging members when the flanges are of proper size, said gauging members being spaced apart during another portion of the rotary path of the rotating gauging member so as to discharge articles failing to pass through the gauging slot; and a resilient roller for pressing the articles toward the gauging members, said roller being rotated by said gauging member rotating means.

11. In a gauging apparatus, the combination of a frame; gauging members; angularly disposed shafts mounted on said frame for supporting said gauging members at a vertical angle relative to each other with the upper halves thereof relatively more closely spaced than the lower halves to form a gauging slot therebetween; work pressing means cooperating with said gauging members; and driving means for concurrently operating at least one of the gauging members and the pressing means.

12. In a gauging apparatus, the combination of a frame; gauging members; angularly disposed shafts mounted on said frame for supporting said gauging members at a vertical angle relative to each other with the upper halves thereof relatively more closely spaced than the lower halves to form a gauging slot therebetween; rotatable work pressing means cooperating with said gauging members; work feeding means; ejector means; and driving means for concurrently operating at least one of the gauging members and the rotatable pressing means.

13. In a gauging apparatus, the combination of a frame, at least one pair of gauging disks, the peripheries of which comprise article gauging and supporting sections; angularly disposed shafts on said frame for supporting the gauging disks at a vertical angle relative to each other whereby the peripheral gauging and supporting sections of the disks are closely spaced at the upper half to form a gauging slot therebetween and widely spaced at the lower half; horizontally disposed roller means in tangential contact with the outer peripheral section of at least one of the gauging disks; and means for rotating at least one of the gauging disks.

14. An apparatus for gauging ammunition components including the combination of a frame, at least one pair of rotatable gauging members; angularly disposed shafts mounted on said frame for supporting said rotatable gauging members at a vertical angle relative to each other with the upper sections thereof more closely spaced than the lower sections to form a gauging slot therebetween to allow undersize ammunition components to drop downwardly between the gauging members; backing means; and means for setting and holding said gauging members and said backing means relative to each other.

WARREN S. REYNOLDS.